April 9, 1957  R. L. SMITH ET AL  2,787,842
ROUGH AIR SIMULATING MEANS FOR GROUNDED AVIATION TRAINERS
Filed Dec. 7, 1951  3 Sheets-Sheet 1
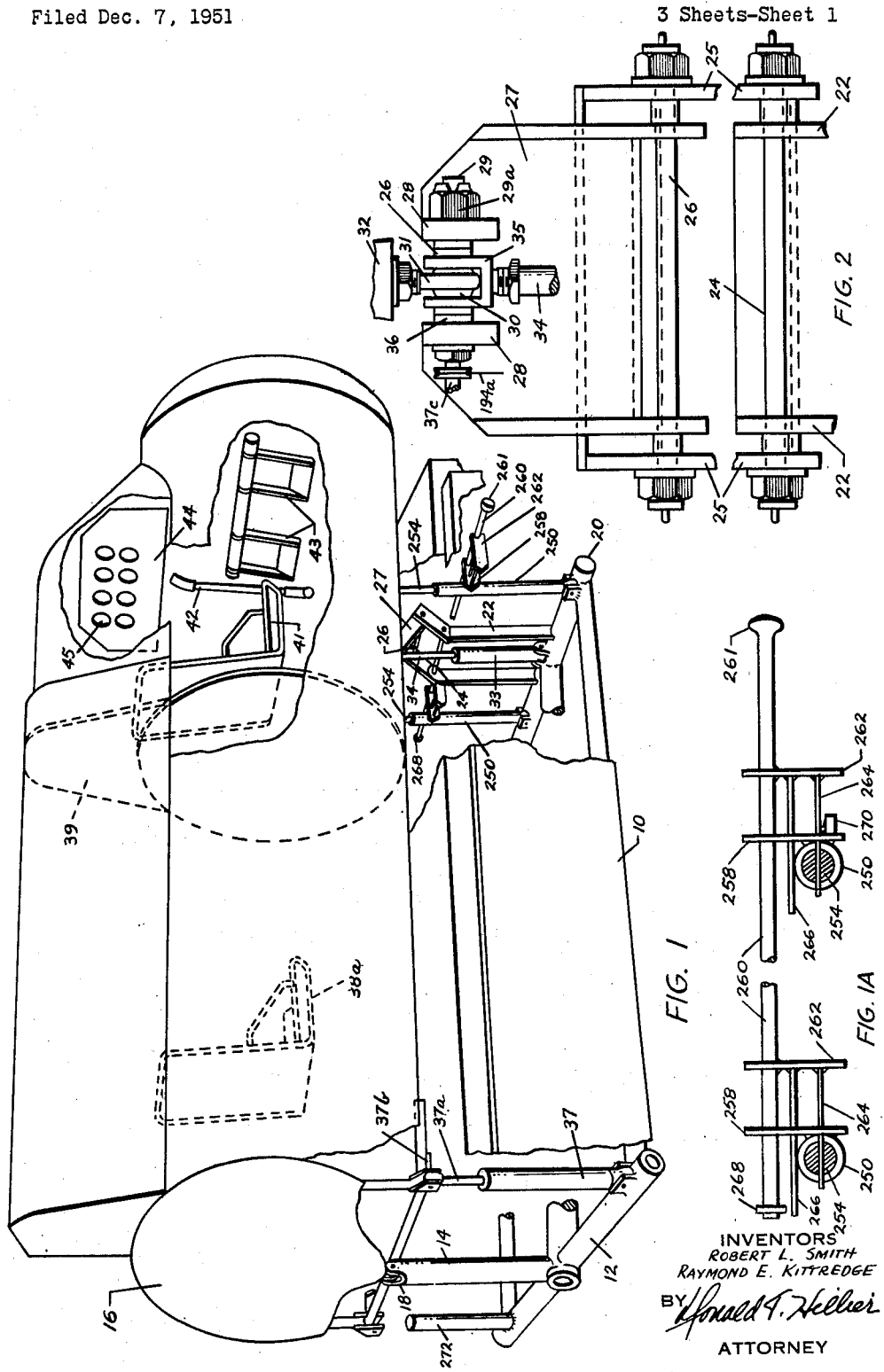
INVENTORS
ROBERT L. SMITH
RAYMOND E. KITTREDGE
BY
ATTORNEY

United States Patent Office 2,787,842
Patented Apr. 9, 1957

2,787,842

ROUGH AIR SIMULATING MEANS FOR GROUNDED AVIATION TRAINERS

Robert L. Smith and Raymond E. Kittredge, Chenango, N. Y., assignors to Link Aviation, Inc., Binghamton, N. Y., a corporation of New York Application December 7, 1951, Serial No. 260,388

8 Claims. (Cl. 35—12)

This invention relates to an improved rough air simulating arrangement for use in conjunction with grounded aviation trainers.

The improved arrangement comprises a relatively long fuselage having the usual student's compartment near the forward end thereof, the fuselage being supported by a first universal mounting on the longitudinal center line of the fuselage near the rear end thereof and by a second universal mounting, on the same center line near the forward end thereof. A first cylinder operated by hydraulic fluid under the control of a rough air regulator has a piston pivotally attached to the rear end of the fuselage at a point transversely displaced from the rear universal support, and upon actuation of the rod the fuselage is moved about a longitudinal axis through the two universal mountings, in simulation of the roll of an aircraft caused by rough air conditions. Also, a second cylinder similarly operated has a rod connected to the second universal mounting, and upon operation of the second cylinder the fuselage is moved about a transverse axis through the rear universal mounting, in simulation of the changes in pitch of an aircraft in actual flight caused by rough air conditions. Also, in view of the fact that the student's compartment is located several feet ahead of the rear universal mounting, operation of the last described cylinder imparts to the student in the trainer the sensation of rapid change in altitude when an aircraft is subjected to an updraft or a down-draft.

The described fuselage three point support and actuating systems provide means whereby a trainer fuselage weighing several tons may be safely supported and suitably moved in simulation of flight of an aircraft through rough air.

Each of the actuating systems includes a hydraulic fluid system adapted to provide the necessary power to move quickly a fuselage of such weight. Each hydraulic fluid system includes a control valve under the control of a novel rough air regulator which comprises means for operating the valve in an irregular pattern, whereby the fuselage movements are correspondingly irregular. Each of the hydraulic actuating systems also includes a hydraulic fluid servo loop, whereby the degree of fuselage movement is very accurately controlled.

Other novel features and objects of the invention will become apparent as the description proceeds.

In order that the detailed nature of the preferred embodiment of the invention may be thoroughly understood, reference is made to the accompanying drawings, wherein, Fig. 1 is a general view of the trainer fuselage, base, and fuselage supporting and actuating members.

Fig. 1A is a detail of the fuselage locking device.

Fig. 2 is a detail of the forward universal mounting arrangement and supporting knee structure.

Figure 3:
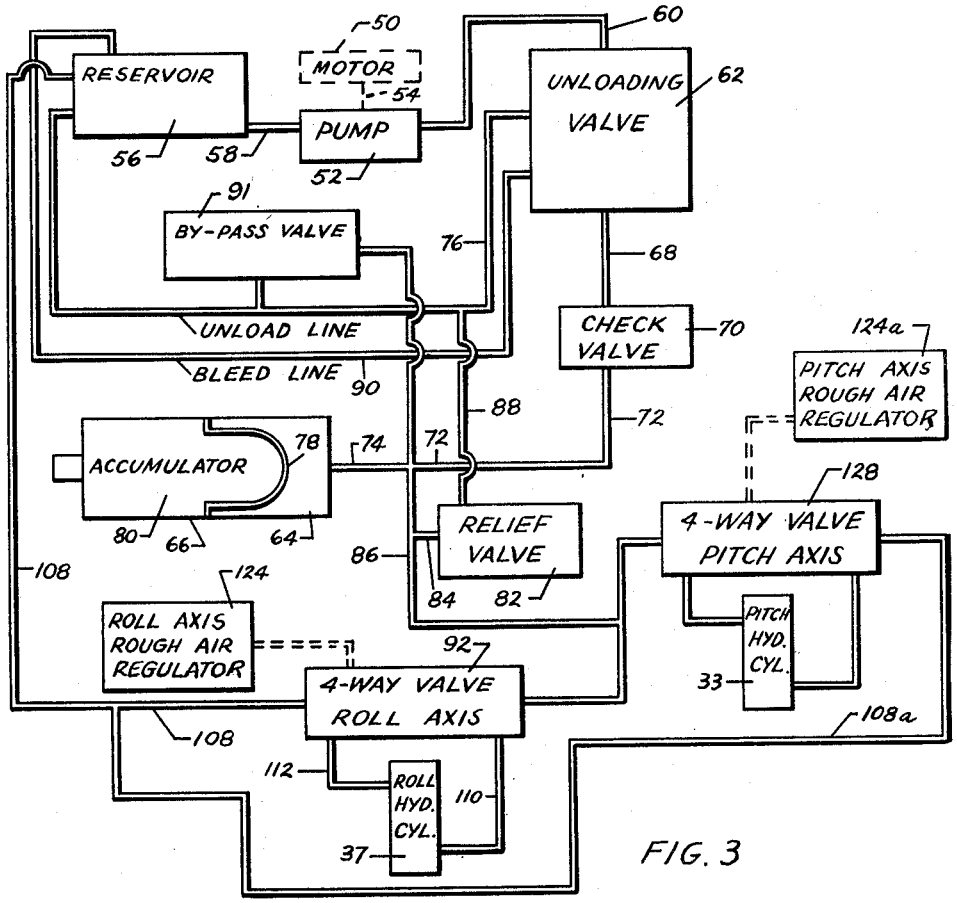
Fig. 3 is a schematic diagram of the hydraulic fluid system.

Reference is made to Fig. 1 wherein it will be seen that the trainer comprises a stationary base 10 comprising a welded tubular steel frame member 12 rigidly supporting a tubular upright 14, the upper end of which pivotally supports the trainer fuselage 16 at the lower rear longitudinal center thereof by a spherical bearing 18. A second tubular steel member 20 is provided near the forward end of the trainer and rigidly supports a channelled upright 22 through the upper end of which passes bolt 24 (Fig. 2) which provides a fixed pivot for the lower end of the channelled lower knee member 25. The outer end of member 25 carries bolt 26 which pivotally supports the lower end of the channelled upper knee member 27 having two ears 28 through which passes bolt 29 which supports an inner spherical bearing member 30, the outer spherical bearing member 31 being fixedly attached to the plate 32 which is rigidly affixed to the bottom of fuselage 16.

The pitch cylinder 33 has its lower end pivotally held by frame member 20, and the upper end of rod 34 of the pitch cylinder carries a yoke 35 straddling bearing member 30. Bolt 29 passes through yoke 35 and washers 36 are provided so that by tightening nut 29a there is no clearance between the elements mounted on bolt 29.

The foregoing described mounting prevents any transverse movement of the member 32 attached to the bottom of fuselage 16.

The lower end of roll cylinder 37 is pivotally attached to member 12, and the upper end of the cylinder rod 37a is pivotally attached to the rear right corner of fuselage 16 by pivot 37b. The fuselage contains an instructor's compartment having a seat 38a, and an aperture 39 is provided through which the instructor may look ahead into the student's compartment. The student's compartment includes a seat 41 for the student, ahead of which are the simulated primary flight controls comprising a stick 42 and rudder pedals 43. The student's instrument panel 44 carries a full complement of simulated instruments 45, including an air speed indicator, vertical speed indicator, altimeter, artificial horizon, magnetic compass, radio compass, etc., certain of which instruments are operated by controls 42 and 43 and others of which are operated by the instructor's radio controls (not shown) and/or course recorder (not shown) in the instructor's compartment in a well-known manner.

Considering now the construction and operation of the hydraulic system shown in Fig. 3, a motor 50 drives a conventional hydraulic pump 52 through connection 54 to pump the hydraulic fluid from reservoir 56 through lines 58 and 60 to the unloading valve 62. Unloading valve 62 is connected through line 68, check valve 70 and lines 72 and 74 to the chamber 64 of accumulator 66, and valve 62 is connected through unload line 76 to the reservoir 56.

When the pressure in chamber 64 of accumulator 66 is below a predetermined level, e. g., 850 p. s. i., valve 62 operates to pass the fluid through line 68, check valve 70 and lines 72 and 74 to chamber 64, until the pressure in the chamber reaches a higher pre-determined level, e. g., 1050 p. s. i. Valve 62 then operates to pass the fluid from line 60 along unload line 76 to the reservoir 56. Accumulator 66 has a flexible membrane 78 separating chamber 64 from chamber 80 which is filled with nitrogen gas under a pressure of about 550 p. s. i. when chamber 64 is empty. Consequently, accumulator 66 provides a volume of hydraulic fluid in chamber 64 under a pressure of from 850 to 1050 p. s. i. without the necessity of motor 50 and pump 54 operating continuously to provide such pressure.

A relief valve 82 is connected through lines 84, 86 and 74 to chamber 64, and this valve is set so that in the event the unloading valve 62 fails to operate as above explained when the pressure in chamber 64 reaches 1050 p. s. i., when the pressure in chamber 64 reaches a higher predetermined level, e. g., 1150 p. s. i., valve 82 operates to pass fluid from valve 70 and chamber 64 through the relief line 88 to line 76 and the reservoir 56. When the pressure in chamber 64 drops below 1150 p. s. i., relief valve 82 closes. Bleed line 90 is provided to carry normal by-pass or leak from valve 62 to the reservoir. A hand operated by-pass valve 91 is provided to regulate the pressure in chamber 64 below that given by valve 62 for test purposes.

Figure 4:
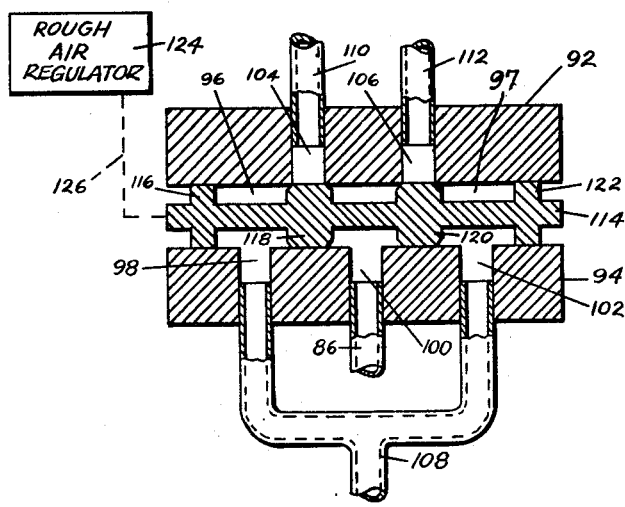
Fig. 4 is a sectional view of one of two four-way valves which form a part of the hydraulic fluid system.

Line 86 routes the hydraulic fluid under the pressure in chamber 64 to the four-way roll axis valve 92, for a disclosure of which reference is made to Fig. 4. The valve comprises a cylindrical body portion 94 having a central longitudinal bore 96 and five radially disposed ports 98, 100, 102, 104 and 106. Port 100 is connected to the pressure line 86 (see Fig. 3), ports 98 and 102 are connected to line 108 which goes to reservoir 56; port 104 is connected to line 110 which extends to the bottom of the hydraulic roll cylinder 37 (Fig. 1); and port 106 is connected to line 112 which extends to the top of cylinder 37. Valve 92 is provided with a stem 114 having a plurality of lands 116, 118, 120 and 122. A roll axis rough air regulator 124 irregularly reciprocates stem 114 by means of connection 126, as more fully hereinafter described.

Stem 114 is shown in Fig. 4 in its neutral or inoperative position. When regulator 124 moves stem 114 to the left of its position shown in Fig. 4, fluid from line 86 under the pressure in chamber 64 passes through port 104 and line 110 to the bottom of hydraulic cylinder 37, forcing the piston rod 37a (Fig. 1) upwardly and rotating the trainer fuselage 16 counter-clockwise as seen from the rear about an axis through the spherical bearings 18 and 30. At the same time the displaced fluid in the top of roll cylinder 37 passes through line 112, port 106, chamber 96, port 102 and line 108 to reservoir 56. An opposite movement of valve stem 114 from the position shown in Fig. 4 will admit fluid from pressure line 86 through the chamber 96, port 106 and line 112 to the top of roll cylinder 37, forcing the rod 37a downwardly, and the displaced fluid in the bottom of the cylinder passes through line 110, port 104, chamber 96, port 98 and line 108 to reservoir 56. The fuselage 16 is then rotated clockwise as seen from the rear about the same axis.

Referring to Fig. 3, a second four way pitch-axis valve 128, identical with valve 92, is connected to line 86 and chamber 64, valve 128 being operated by the pitch axis rough air regulator 124a to admit fluid to the top or bottom of the pitch cylinder 33 (Fig. 1) to cause rod 34 to go down or up to depress or elevate the nose of fuselage 16, fuselage 16 moving about a transverse axis through spherical bearing 18. The displaced fluid from cylinder 33 is transmitted through lines 108a and 108 to reservoir 56.

Considering now the construction and operation of the roll axis rough air regulator 124 (Fig. 5), there are provided two random cams 140 and 142 independently rotatably mounted upon shaft 144. Motor 146 drives gear 148 through connection 150, and gear 148 drives gear 152 which is affixed to cam 140 at a preselected rate, e. g. three R. P. M. Motor 146 drives cam 142 through a separate connection and pair of gears (not shown) arranged in corresponding manner at a slightly different rate, e. g. three and one-tenths R. P. M. Arm 154 has one end pivotally mounted at fixed pivot 156, and arm 154 carries a rotatable cam rider 158 of sufficient width to engage the periphery of either or both of the cams 140 and 142, depending upon the instant rotatable positions of the cams. By virtue of the different rotational speeds of cams 140 and 142, the combined surfaces of both cams engaged by the cam follower 158 function as a unitary cam of continuously changing contour.

The lower end of arm 154 carries pivot 160 which in turn carries the lower end of link 162, the other end of which is connected to arm 164 by pivot 166. The upper end of arm 164 is connected by pivot 167 to plate 168 which is pivotally mounted upon shaft 144, and motor 170 rotates screw 172 thereby moving the screw longitudinally to rotate plate 168 about shaft 144. Cable 126 has one end connected at the lower end of arm 164, and this cable extends around the fixed pulley 176, pulley 178 carried by the lower end of lever 180, floating pulley 182 and has its end connected to the fixed member 184 which may be any suitable part of the base 12 of the trainer. Pulley 182 is rotatably mounted upon shaft 186 which is connected by line 126a to one end of the stem 114 (Fig. 4) of the roll axis valve 92, and the other end of the stem of the valve is connected to one end of spring 188, the other end of which is connected to the fixed member 190. The lever 180 is mounted upon fixed pivot 192 and one end of cable 194 is connected to the upper end of lever 180, cable 194 extending around pulley 196 and having its upper end attached to pivot 37b (Fig. 1). Spring 197 is provided to maintain tension cable 194.

When the instructor's rough air control is on, as hereinafter described, motor 146 is energized to rotate cams 140 and 142 at slightly different rates of speed, and rider 158 moves arm 154 about its pivot 156 in accordance with the rotation of the cams. Assuming that rider 158 is moved to the left of its predetermined neutral position, link 164 is pivoted clockwise and cable 126 pulls the stem 114 of valve 92 to the left, and as previously explained in connection with the description of Fig. 4, hydraulic fluid under the pressure in chamber 64 of the accumulator is admitted to the bottom of the roll cylinder 37, forcing the cylinder rod 37a upwardly, and rolling the trainer fuselage counterclockwise as seen from the rear. As soon as the trainer fuselage starts to roll, cable 194 pulls the upper end of lever 180 to the left in Fig. 5, moving pulley 178 and valve stem 114 to the right a distance proportional to the trainer fuselage roll. When the fuselage has rolled sufficiently far to move stem 114 to the right by an amount exactly equal to the distance stem 114 was moved to left, the fuselage roll stops. Consequently, the roll movements of the fuselage follow the combined peripheral patterns of cams 140 and 142 by virtue of the provided hydraulic servo system.

Figure 5:
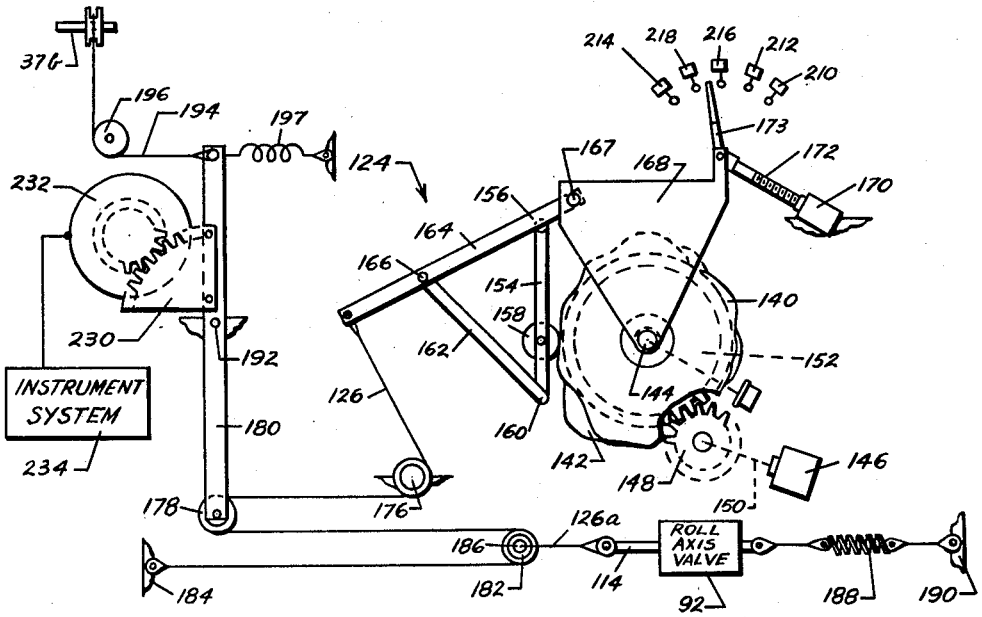
Fig. 5 is a schematic view of one of the rough air regulators and associated parts.

It is believed obvious that when rider 158 moves to the right in Fig. 5, valve 92 is operated to roll fuselage 16 clockwise as seen from the rear, and the servo system operates to limit the fuselage roll according to the displacement of rider 158.

In view of the level of pressure in chamber 64 of the accumulator the roll movements of the fuselage are relatively rapid, and the amplitude of movements is proportional to the displacement of rider 158 from its predetermined neutral position.

Figure 6:
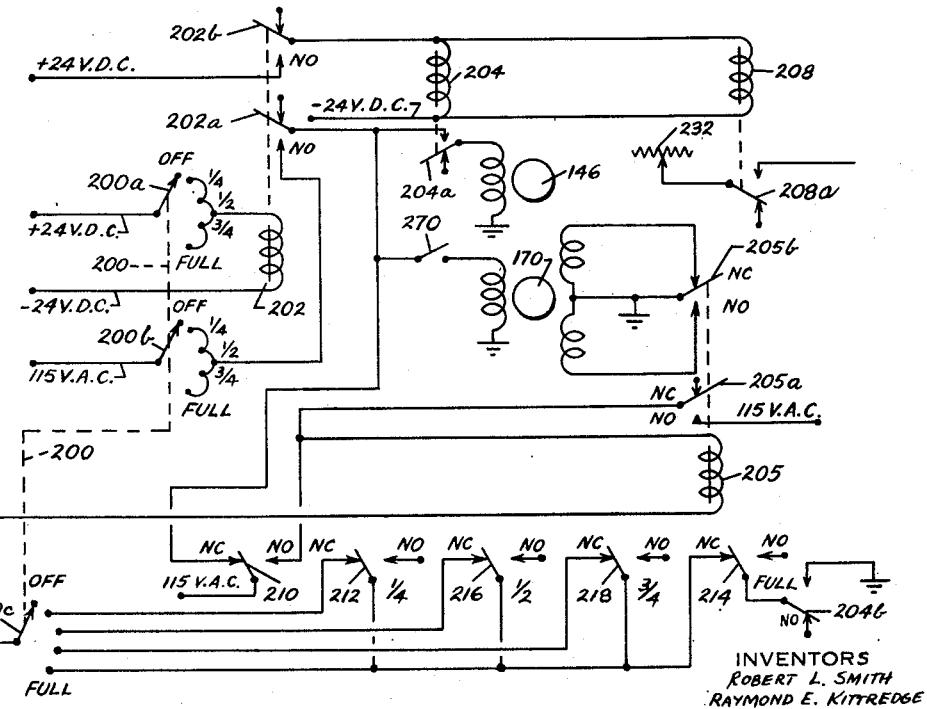
Fig. 6 is a wiring diagram of the electric circuit which controls the motor of each of the rough air regulators.

As previously stated, means are provided whereby the instructor may vary the intensity of the rough air simulation accomplished by means of irregularly moving the fuselage. Referring to Fig. 6, when the instructor sets the instructor's rough air intensity switch 200 in the "¼" position, the rough air relay 202 is energized by 48 v. D. C. passing through switch 200a, moving the contacts 202a and 202b of relay 202 to the NO positions and 48 v. D. C. is then applied through the contact 202b across relays 204 and 208, energizing the same. The energization of relay 204 closes contacts 204a and 204b, at the same time, 115 v. A. C. is applied through switch 200b, 202a and switch 270 to the field winding of motor 170, energizing the same, and through contact 204a energizing the field of motor 146 which drives cams 140 and 142. Switch 270 is closed under conditions hereinafter described. Relay 205 is energized by 115 v. A. C. passing through the NO contact of switch 210, as later explained, relay 205, switch 200c, the NC contact of switch 212, the NC contact of "Full" switch 214 and switch 204b controlled by relay 204 to ground. The energization of relay 205 moves switches 205a and 205b into their NO positions, and 115 v. A. C. is applied through the switch 205a of relay 205 and through the relay and the just described circuit to ground, providing a holding circuit to keep the relay energized. The moving of the switch 205b controlled by relay 205 into its NO position grounds the lower shading coil of motor 170, causing the motor to run in a predetermined direction. The energization of motor 170 (Fig. 5) rotates plate 168 counter-clockwise by means of screw 172 and also moves the switch actuator 173 relative to the switches 210, 212, 216, 218, and 214. When actuator 173 begins to move, the contact of switch 210 moves into its NC position, opening the basic circuit to relay 205 through switch 210, but the holding circuit keeps the relay energized. When the actuator reaches the "¼" switch 212, the holding circuit of relay 205 is also opened, and the relay is deenergized. The initially shorted lower shading coil of motor 170 is opened, and the upper shading coil is grounded, causing motor 170 to run in the opposite direction until actuator 173 returns to its initial or "Off" position, placing switch 210 in its NO position. This positioning of actuator 173 reenergizes relay 205, and the same cycle of operation of the apparatus is repeated, etc.

It is deemed unnecessary to explain in detail that when the instructor places the rough intensity control switch 200 in the "½," "¾" or "Full" positions, the actuator 173 will oscillate between the "Off" position and the selected switch 216, 218 or 214 in the same manner as described in connection with "¼" rough air operation.

Assuming that the switch 200 has been placed in the "¼", "½", "¾" or "Full" position for a period of time, during which period the apparatus has functioned to move the fuselage 16 in simulation of the movements imparted by rough air conditions to a plane in flight, and then the instructor moves the switch 200 into the "Off" position to cease such simulation, all the relays of Fig. 6 become deenergized. In the event the actuator 173 is not in the "Off" position, switch 210 is on its NC contact, and 115 v. A. C. is fed therethrough to the field winding of motor 170, maintaining the same energized until actuator 173 reaches the "Off" position, moving switch 210 into its NO position and deenergizing the field of motor 170.

The energization of relay 208 closes switch 208a which connects potentiometer 232 (Fig. 5) to the instrument system in the trainer so that the instrument indications are affected to reflect the simulated rough air conditions.

Referring to Fig. 5, the described operation of motor 170 reciprocates plate 168 on shaft 144. When pivot 167 is directly above pivot 156, actuator 173 engages "Full" switch 214 at its extremity of travel, and deflection of rider 158 imparts maximum motion to the lower end of arm 164, cable 126 and valve stem 114. Consequently, the roll movements imparted to fuselage 16 are maximum. When actuator 173 engages switch 210, pivot 166 is directly above pivot 156, and deflection of rider 158 imparts no motion to the lower end of arm 164, cable 126 or valve stem 114. And consequently, no roll movements are imparted to fuselage 16. Plate 168 is at its respective limits of travel when pivots 166 and 167 are above pivot 156, and the plate travels through a proportionate part of its entire possible arc of travel depending upon whether switch 200 is in the "Off" "¼", "½", "¾" or "Full" position. When switch 200 is in any particular position, e. g., the "½" position, the displacement of stem 114 is constantly varied from zero to the corresponding fraction of full displacement of the stem under the control of the cams and rider.

Referring to Fig. 3, a second rough air regulator 124a and hydraulic servo system are provided for controlling the operation of the pitch axis four-way valve 128 which controls the operation of the pitch cylinder 33 to move the trainer about a transverse axis through spherical bearing 18 to produce pitch axis rough air movements. The pitch axis rough air regulator 124a, the pitch axis four-way valve 128 and the pitch axis hydraulic cylinder 33 shown schematically in Fig. 3 are constructed and operate in the same manner as the corresponding parts of the roll axis system. The cable 194a (Fig. 2) of the pitch axis system corresponds to the cable 194 of the roll axis system, and cable 194a is connected to stud 37c (Fig. 2).

The provision of the two rough air regulators 124 and 124a, each comprising two cams 140 and 142 rotating at slightly different rates of relatively low speeds, and provided with a reciprocating plate 168 for constantly varying the amplitude of displacement of the valve stem 114 produces an arrangement which, when set in operation with the instructor's switch 200 in a given position, e. g., "¾," will impart irregular movements to the trainer fuselage in simulation of rough air flying conditions in a pattern which will not be repeated for a period of several days. Thus there is no chance for the student "flying" the trainer to memorize the pattern of fuselage movement and thereby anticipate the same in his "flying" of the trainer.

Referring to Fig. 5, the lever 180 has affixed thereto a gear sector 230 which operates the rotor of potentiometer 232 which forms a part of the instrument system 234 comprising an electrically operated air speed indicator, vertical speed indicator, altimeter, artificial horizon, etc. (all not shown). The pitch rough air system operates a corresponding potentiometer. Consequently, whenever the fuselage 16 is rolled or pitched by the rough air systems, proper instrument deflections are shown by the instruments on the panel 44 in fuselage 16.

The hydraulic servo system provides means whereby the heavy fuselage 16 may have its movements positively controlled, which movements are of a suddenness comparable to the movements imparted by rough air conditions to a plane in actual flight. The provision of the seat 41 for the student pilot several feet ahead of bearing 18 imparts to the student in the trainer a realistic "g" effect when the pitch cylinder 33 is operated.

A pair of tubes 250 (Fig. 1) have their lower ends pivoted upon the transverse member 20 underneath opposite sides of fuselage 16, and slidably mounted inside each of these tubes is a rod 254, the upper end of each of which is pivotally attached to the lower side of fuselage 16. A plate 258 (Fig. 1A) is fixedly attached to each of the tubes 250, as by welding, and a transverse rod 260 having a knob 261 at one end thereof passes through clearance holes in each of the plates 258. Rod 260 in turn has two plates 262 affixed thereto, as by welding, and each plate 262 carries two pins 264 and 266. Holes are provided in plates 258, tubes 250 and rods 254 through which the associated pin 264 may pass when fuselage 16 is level, thereby providing with bearing 18 a three point support for fuselage 16 when the hydraulic system is not in operation. Each of the pins 266 passes through a hole in its associated plate 258, pins 266 being longer than pins 264 and provided to prevent rotation of plates 262, pins 264 and rod 260 about the axis of the rod 260 when pins 264 are retracted by pulling handle 261 to permit the aforedescribed fuselage movements. A collar 268 is provided on one end of rod 260 to prevent withdrawal of pins 266 from their clearance holes in plates 258.

A micro-switch 270 is affixed to one of the plates 258 (Fig. 1A), and when the associated pin 264 is removed from plate 258 switch 270 closes. Referring to Fig. 6, the closing of switch 270 permits operation of the electrical circuit which controls the rough air hydraulic system, as hereinbefore described.

An emergency stop 272 (Fig. 1) is provided at the rear of fuselage 16 to provide, together with spherical bearing 18 and spherical bearing 30, a three-point support for fuselage 16 in the event the hydraulic system fails during operation, and fuselage 16 tips to the left. The same bearings and cylinder 37 provide a similar support in the event the fuselage tips to the right upon failure of the hydraulic system.

It will be appreciated that numerous changes may be made in the aforedescribed construction of the invention without departing from the substance thereof as covered by the following claims.

The embodiments of the invention in which an exclusive property or privilege is claimed are defined as follows:

1. In a simulated aircraft training device having a stationary base and a movable fuselage mounted thereon, a first mounting means supporting said fuselage for universal movement about a first point in proximity to one end thereof, a second mounting means pivotably connected to said fuselage and supporting said fuselage at a second point spaced a substantial distance from said first point, said first and second points located on a line parallel to the longitudinal axis of said fuselage, a third mounting means pivotably connected to said fuselage to support said fuselage at a point substantially removed from said line between said first and second points, a trainee's compartment in said fuselage located at one end thereof a substantial distance from said first point, hydraulic cylinder means connected with said second and third mounting means, hydraulic power means including a source of hydraulic fluid under pressure and a valve for controlling hydraulic fluid pressure in each of said cylinders, motor driven valve operating means for operating said valve at irregular intervals to alternately increase and decrease pressure in said cylinders whereby said fuselage is moved about said first point, negative feedback means connecting said valve operating means with said fuselage to limit movement of said fuselage about said first point, and adjustable control means connected with said motor driven means and said feedback means for varying the amplitude of fuselage movement between predetermined limits.

2. The combination of claim 1 including a plurality of simulated flight instruments in said trainee's compartment and variable electrical means connected with said instruments and with said feedback means for affecting the indications of said instruments concurrently with movement of said fuselage.

3. The combination of claim 1 including an instructor's station outside said trainee's compartment and a manually adjustable control at said instructor's station connected with said motor driven valve operating means and said feedback means for varying the amplitude of motion imparted by said motor driven means to said valve operating means.

4. The combination of claim 1 characterized by a hydraulic cylinder connected to said second mounting means to move said fuselage about an axis passing through said first point and normal to the line between said first and second points to simulate pitching motion in said fuselage, a hydraulic valve connecting opposite ends of said cylinder with said source of hydraulic fluid under pressure, a first motor driven means including a cam of continuously changing contour coupled to said valve for operating said valve at irregular intervals, second motor driven means for varying the coupling between said first motor driven means and said valve, and electrical control means for reversibly operating said second motor means through a predetermined time cycle.

5. In a simulated aircraft training device having a stationary base and a movable fuselage mounted thereon, first mounting means to support said fuselage for universal movement about a first point in proximity to one end thereof, second mounting means pivotably connected to said fuselage to support said fuselage at a second point spaced a substantial distance from said first point, said first and second points located on a line parallel to the longitudinal axis of said fuselage, third mounting means pivotably connected to said fuselage to support said fuselage at a point substantially removed from said line between said first and second points, a trainee's compartment in said fuselage located at one end thereof a substantial distance from said first point, simulated flight instruments in said compartment, an instructor's station outside said trainee's compartment, hydraulic cylinder means connected with said second and third mounting means, hydraulic power means including a source of hydraulic fluid under pressure and a valve for controlling hydraulic fluid pressure in each of said cylinders, motor driven valve operating means for operating said valve at irregular intervals to alternately increase and decrease pressure in said cylinders whereby said fuselage is moved about said first point in simulation of rough air effects, negative feedback means connecting said valve operating means with said fuselage to oppositely move said valve in response to each movement of said fuselage, adjustable control means at said instructor's station connected with said motor driven valve operating means for varying the maximum amplitude of motion imparted by said motor driven means to said valve operating means, and variable electrical means connected with said motor driven means and said instruments for affecting the indications of said instruments concurrently with movement of said fuselage.

6. In rough air simulation means for grounded aviation trainers, the combination comprising a plurality of irregularly shaped cams mounted for rotation about a common axis, driving means for rotating said cams about said axis at slightly differing angular velocities, a cam follower adapted to engage surface portions of all of said cams, means holding said cam follower in constant engagement with the surface of at least one of said cams, lever coupling means connecting said cam follower with rough air simulation control means, and means for continuously varying the effective lever arm of said coupling means.

7. The combination of claim 6 including reversible electric motor means for varying the effective lever arm of said coupling means.

8. The combination of claim 7 including a recycling motor control circuit for automatically reversing said electric motor after a predetermined period of operation of said motor in either direction, and adjustable means in said control circuit for varying said predetermined cyclic period of motor operation in each direction.

References Cited in the file of this patent

UNITED STATES PATENTS

| | | |
|---|---|---|
| 1,789,680 | Gwinnett | Jan. 20, 1931 |
| 1,895,737 | Shaw | Jan. 31, 1933 |
| 2,422,552 | Jensen | June 17, 1947 |
| 2,442,297 | Link Jr. | May 25, 1948 |
| 2,485,291 | Kail | Oct. 18, 1949 |
| 2,510,500 | Hayes et al. | June 6, 1950 |
| 2,510,578 | Kail | June 6, 1950 |
| 2,524,238 | Soule | Oct. 3, 1950 |